United States Patent [19]

Adams

[11] Patent Number: 5,801,262
[45] Date of Patent: Sep. 1, 1998

[54] PROCESS FOR PREPARING POLYSILOXANE MICROSPHERES WITH A NARROW SIZE DISTRIBUTION

[75] Inventor: Mary Elizabeth Adams, Schenectady, N.Y.

[73] Assignee: General Electric Company, Schenectady, N.Y.

[21] Appl. No.: 885,267

[22] Filed: Jun. 30, 1997

[51] Int. Cl.$^6$ ........................................................ C07F 7/08
[52] U.S. Cl. ............................. 556/450; 528/10; 528/12; 528/16
[58] Field of Search ............................. 556/450; 528/10, 528/12, 16

[56] References Cited

U.S. PATENT DOCUMENTS

| | | |
|---|---|---|
| 4,528,390 | 7/1985 | Kimura . |
| 4,871,616 | 10/1989 | Kimura et al. . |
| 5,247,043 | 9/1993 | Nakashima ........................ 556/450 X |
| 5,412,053 | 5/1995 | Lichtenhan et al. ..................... 528/9 |
| 5,589,562 | 12/1996 | Lichtenhan et al. ................ 556/450 X |

FOREIGN PATENT DOCUMENTS 63-295637  5/1987  Japan .
02502664  5/1996  Japan .

*Primary Examiner*—Paul F. Shaver
*Attorney, Agent, or Firm*—Vinit G. Kathardekar; William H. Pittman

[57] ABSTRACT

The present invention relates to a process to prepare polysiloxane microspheres with narrow size distribution having a particle size in the range of about 0.5 microns to about 10 microns. The first step involves combining, by weight, an optional anionic surfactant, a polymeric stabilizer, an hydroxide base, and water to form a first aqueous mixture to which is added a silane monomer to form a second aqueous mixture. The second aqueous mixture is then stirred at a temperature of from about 5° C. to about 90° C. for at least about 1 hours to form an aqueous dispersion comprising polysiloxane microspheres. The polysiloxane microspheres upon separation may be optionally washed with water and optionally dried at a temperature of up to about 300° C. The polysiloxane microspheres can be further optionally jet treated to yield polysiloxane microspheres with a narrow size distribution having a particle size in the range of about 0.5 microns to about 10 microns.

10 Claims, No Drawings

PROCESS FOR PREPARING POLYSILOXANE MICROSPHERES WITH A NARROW SIZE DISTRIBUTION

FIELD OF INVENTION

The instant invention relates to a process to prepare polysiloxane microspheres having a narrow particle size distribution.

BACKGROUND OF THE INVENTION

Preparation of poly siloxanes have been the subject matter of various patents and other publications. Thus, U.S. Pat. No. 4,528,390 discloses the preparation of powdered poly siloxanes from methyl trialkoxy silanes by hydrolysis and polycondensation. The preparation is carried out by hydrolyzing and polycondensing methyltrialkoxy silane or its derivatives in an aqueous solution containing ammonia or amines at 70°–90° C. for 1 to 2 hours. This patent does not however discuss controlling the particle size in a narrow size distribution. U.S. Pat. No. 4,871,616 discloses surface treated polymethylsilsesquioxane powder to give individual completely spherical particles with uniform particle size and controlled contact charge amount. The powder thus obtained comprises individual polymethylsilsesquioxane particles with true spherical shape and a particle size wherein more than 80% is in the range of ±30% of the average particle size. The average particle size of polymethylsilsesquioxane powder is 0.1–20 microns.

Japanese patent application J63295637 discloses preparation of spherical polymethylsilsesquioxane powder by hydrolyzing and condensation polymerizing at interface between lower amine and/or ammonia containing layer and upper silane containing layer. The spherical polymethylsilsesquioxane powder comprises spheres having an average size of 0.05–0.8 microns and a size distribution where at least 95% of the total particles fall within a range of ±50% of the average particle size. Japanese patent application JP02502664 discloses fine cluster polymethyl silsesquioxane powders having a narrow particle size distribution. These fine clustered polymethylsilsesquioxane powder with average particle size of 0.1–10 microns is formed by melting and coagulating fine sphere powders with particle sizes of 0.01–1.5 microns.

The existing methods do not teach a process to make polysiloxane microspheres with a narrow size distribution using stabilizers. The advantage of using stabilizers is that they promote higher solid content while maintaining particle stability, faster rates of reaction due to increased monomer/water interfacial area, and lowers coagulum formation. There is thus a need for a process to make polysiloxane microspheres with a narrow size distribution using stabilizers.

SUMMARY OF THE INVENTION

The instant invention provides a process to prepare polysiloxane microspheres with narrow size distribution having a particle size in the range of about 0.5 microns to about 10 microns comprising the steps of: (a) combining, by weight, about 0–100 parts of an anionic surfactant, from about 0.01 to about 100 parts of a polymeric stabilizer, from about 0.01 to about 100 parts of an hydroxide base, per about 500 to about 1000 parts of water to form a first aqueous mixture; (b) adding to said first aqueous mixture from about 5 to about 700 parts, by weight of the water from said first aqueous mixture, of a silane monomer to form a second aqueous mixture; (c) stirring the second aqueous mixture at a temperature of from about 5° C. to about 90° C. for at least about 1 hour to form a aqueous dispersion comprising polysiloxane microspheres; (d) separating the polysiloxane microspheres from the aqueous dispersion; (e) optionally washing the polysiloxane microspheres with water and optionally drying the washed polysiloxane microspheres at a temperature of up to about 300° C.; and (g) optionally jet treating/milling the dry polysiloxane microspheres to yield polysiloxane microspheres with a narrow size distribution having a particle size in the range of about 0.5 microns to about 10 microns.

DETAILED DESCRIPTION OF THE INVENTION

The present invention relates to a process to prepare polysiloxane microspheres with narrow size distribution having a particle size in the range of about 0.5 microns to about 10 microns. The first step involves combining, by weight, about 0–100 parts of an anionic surfactant, from about 0.01 to about 100 parts of a polymeric stabilizer, from about 0.01 to about 100 parts of an hydroxide base, per about 500 to about 1000 parts of water to form a first aqueous mixture. To said first aqueous mixture is then added from about 5 to about 700 parts of a silane monomer, based on the weight of the water in said first aqueous mixture, to form a second aqueous mixture. The second aqueous mixture is then stirred at a temperature of from about 5° C. to about 90° C. for at least about 1 hour to form an aqueous dispersion comprising polysiloxane microspheres. The polysiloxane microspheres are then separated from the aqueous dispersion, optionally washed with water and optionally dried at a temperature of up to about 300° C. The polysiloxane microspheres can be further optionally jet treated/milled to yield polysiloxane microspheres with a narrow size distribution having a particle size in the range of about 0.5 microns to about 10 microns.

A preferred process of the instant invention is one wherein the anionic surfactant is a dialkyl sulfosuccinate, alkyl benzene sulfonate, disodium lauryl phenol ether disulfonate, alkyl phenyl ether disulfonate, or alkyl sulfate. The preferred anionic surfactant is disodium lauryl phenol ether disulfonate (Dowfax® 2A1). Another preferred embodiment of the instant invention provides a process wherein the polymeric stabilizer is a poly(vinyl pyrrolidone), ethoxylated alkyl phenol, or block copolymers of propylene oxides and ethylene oxide.

A preferred embodiment provides a process wherein the hydroxide base is a alkali metal hydroxide or ammonium hydroxide, and the silane monomer is a alkoxy silane monimer. Yet another preferred embodiment provides a process wherein the metal hydroxide is a alkali metal hydroxide, the alkoxy silane monomer is methyltrimethoxy silane, and wherein the reaction mixture is stirred at a temperature of from about 10° C. to about 75° C. A further preferred process is one wherein the polysiloxane microspheres are separated from the aqueous dispersion using filtration techniques.

Another embodiment provides a process wherein the polysiloxane microspheres are dried at a temperature of from about 175° C. to about 225° C. Also provided is a process wherein the second aqueous mixture comprises up to about 50 parts by weight of a anionic surfactant selected from a dialkyl sulfosuccinate, alkyl benzene sulfonate, dialkyl benzene sulfonate, and alkyl sulfate, from about 2 to about 15 parts by weight of a polymeric stabilizer, from about 10 75 parts by weight of a metal hydroxide, per about 500 parts by weight of water, in addition from about 50 to about 350 parts by weight of an alkoxy silane monomer per about 500 parts of water. A further preferred process is one wherein the second aqueous mixture is stirred at a temperature of from about 10° C. to about 60° C. for about 15 to 30 hours.

As used herein a (polymeric) stabilizer is a water soluble compound/polymer which can reside at the droplet/water or particle/water interface and prevent the particles from agglomerating/coalescing with each other. The silane monomer of choice is a alkoxy silane monomer, however other silane monomers of the class acetoxy silane or amino silanes can be effectively used in the process of the instant invention. The poly dispersity index measures the ratio of the volume average diameter to the number average diameter. Thus a polydispersity index of 1.00 indicates that all particles are of identical size, i.e., are mono disperse. The ideal polydispersity index of the resin particles is 1.00. The poly dispersity index of the resin particles that can be obtained by a process of the instant invention is between about 1.001 to about 1.1.

EXPERIMENTAL DETAILS

Methylsilsesquioxane resin microspheres of narrow particle size distribution have been prepared in the range of 0.5 to 10 microns by hydrolysis/condensation of a dispersion of methyltrimethoxy silane in a basic aqueous surfactant solution. Surfactant mixtures successfully employed include disodium lauryl phenol ether disulfonate (Dowfax® 2A1) with a polyvinyl pyrrolidone (PVPK-30®), sodium dihexyl sulfosuccinate (Aerosol®MA), PVPK-30®, Dowfax®2A1/ polymethoxylated alkyl ethers, although the method is not limited to these stabilizing agents. The reactions can be run under batch conditions, or semi-batch conditions whereby an aqueous surfactant solution and methyltrimethoxy silane are fed, into separate feed streams, into the reactor which contains aqueous ammonium hydroxide solution. Resin micro sphere particle size is controlled by ammonium hydroxide concentration, surfactant concentration, methyltrimethoxy silane/water ratio, temperature, agitation, and semibatch feed time. The method is not limited to the production of narrow particle size distributions. Broad particle size distributions can be achieved by the appropriate surfactant such as sodium dodecylbenzene sulfonate with polyvinylpyrrolidone.

A preferred method of forming non-agglomerated polysiloxane microsphere particles is jet treating/milling. This method comprises accelerating the feed particles by means of propellant jets (air, gas, or steam) with high velocities (up to sonic or supersonic speeds, i.e., 500–1200 m/s). Communication occurs by inter particle collision or by impact with an impact surface (target) resulting in very fine particles. Details of the jet treating/milling and impact treating/milling processes are as discussed in Ullmann's Encyclopedia of Industrial Chemistry, Volume B-2, Unit Operations 1, 5$^{th}$ Edition, Wolfgang Gerhartz, Editor and are incorporated herein by reference. Other methods known to one skilled in the art can be used to provide the polysiloxane microspheres. The examples use ammonium hydroxide, however (alkali) metal hydroxides, water soluble organic bases and other hydroxide bases known to one skilled in the art can also be used. Water soluble bases are preferred. The different reactants used in the examples are obtained from sources known to one skilled in the art.

The following examples illustrate the different aspects of the instantly claimed process.

EXAMPLES

Example 1

186 Grams of methyltrimethoxy silane was added at room temperature, with agitation, to a reactor containing 500 grams of water, 4.77 grams of Dowfax® 2A1 (47%) surfactant, 0.34 grams of poly(vinylpyrrolidone) and 0.01 grams of ammonium hydroxide (30%). The reaction was allowed to proceed under adiabatic conditions, with agitation. The product consisted of a stable dispersion of methylsilsesquioxane resin particles and water. The resin particles were separated from the water by filtration using a Buchner funnel followed by washing with water. The washed resin particles had a narrow particle size distribution around 7 microns.

Example 2

942 grams of water and 0.45 grams of ammonium hydroxide (30%) were added batchwise to a reactor and cooled to 15° C. Two separate feed streams were concurrently fed into the reactor over a period of 60 minutes. The first feed stream consisted of 361 grams of methyltrimethoxysilane and the second was an aqueous solution consisting of 93.6 grams water, 3.3 grams of Dowfax® 2A1 (47%) and 0.32 grams of poly(vinyl pyrrolidone). The reaction temperature was maintained at 150° C. The reaction product consisted of a stable latex of methyl sesquioxane resin particles in water. The resin particles were separated from the water by filtration using a buchner funnel followed by washing with water. The washed resin particles had a narrow particle size distribution around 4.0 microns and polydispersity index around 1.005.

Example 3

942 grams of water and 0.45 grams of ammonium hydroxide (30%) were added batchwise and cooled to 150° C. Two separate feed streams were concurrently fed into the reactor over a period of 120 minutes. The first feed stream consisted of 361 grams of methyltrimethoxysilane and the second was an aqueous solution consisting of 93.6 grams water, 3.3 grams of Dowfax® 2A1 (47%) and 0.32 grams of poly(vinyl pyrrolidone). The reaction temperature was maintained at 15° C. The reaction product consisted of a stable latex of methyl sesquioxane resin particles in water. The resin particles were separated from the water by filtration using a Buchner funnel followed by washing with water. The washed resin particles had a narrow particle size distribution around 3.0 microns.

Example 4

942 grams of water and 0.45 grams of ammonium hydroxide (30%) were added batchwise to a reactor and cooled to 15° C. Two separate feed streams were fed into the reactor concurrently over a period of 120 minutes: the first feed stream consisted of 361 grams of methyltrimethoxysilane and the second was an aqueous solution consisting of 93.6 grams water, 6.58 grams of Aerosol® MA80 (sold by Cytec Industries)(80%) and 0.64 grams of poly(vinyl pyrrolidone). The reaction temperature was maintained at 15° C. The reaction product consisted of a stable latex of methyl sesquioxane resin particles in water. The resin particles were separated from the water by filtration using a buchner funnel followed by washing with water. The washed resin particles a narrow particle size distribution around 1.5 microns.

Example 5

20724 grams of water was added to a 10 gallon reactor and cooled to 15° C. with agitation, after which 6.88 grams of ammonium hydroxide (30%) was added. Two separate feed streams were fed into the reactor concurrently over a period of 60 minutes: the first feed stream consisted of 7942 grams of methyltrimethoxysilane and the second was an aqueous solution consisting of 2059 grams water, 72.6 grams of Dowfax® 2A1 (sold by Dow Chemical Company) (47%) and 7.04 grams of poly(vinyl pyrrolidone) (M.Wt. 40000). The reaction temperature was maintained at 15° C. The reaction product consisted of a stable latex of methyl sesquioxane resin particles in water. The resin particles were separated from the water by filtration using a Buchner funnel followed by washing with water. The washed resin particles had a narrow particle size distribution around 4.0 microns and polydispersity index around 1.005.

Example 6

15072 grams of water and 7.2 grams of ammonium hydroxide (30%) were added to a 10 gallon reactor with agitation and allowed to stir at ambient temperature. Two separate feed streams were fed into the reactor concurrently over a period of 60 minutes: the first feed stream consisted of 5776 grams of methyltrimethoxysilane and the second was an aqueous solution consisting of 1497 grams water, 52.8 grams of Dowfax® 2A1 (47%) and 5.1 grams of poly(vinyl pyrrolidone). The reaction was allowed to run under adiabatic conditions, reaching a maximum temperature of 35° C. The reaction product consisted of a stable latex of methyl sesquioxane resin particles in water. The resin particles were separated from the water by filtration using a buchner funnel followed by washing with water. The washed resin particles had a narrow particle size distribution around 2.5–3 microns.

Example 7

500 grams of water and 0.21 grams of a 30% ammonium hydroxide solution were added batchwise to a reactor and cooled to 15° C. Two separate feed streams were fed into the reactor concurrently over a period of 120 minutes: the first feed stream consisted of 243 grams of methyltrimethoxysilane. The second feed stream was divided between two aqueous surfactant solutions such that the first surfactant solution, consisting of $8.2 \times 10^{-4}$ grams of poly(ethyleneglycol)-b-poly(propyleneglycol)-b-poly(ethyleneglycol) (Pluronic® F68 sold by BASF) and 25 grams of water, was fed in portions into the reactor over 60 minutes; the second surfactant solution, consisting of 0.8 grams of Pluronic® F68 and 24.2 grams of water, was fed in portions into the reactor over a 60–120 minutes time period. The reaction temperature was maintained at 15° C. The reaction product consisted of a stable latex of methylsilsesquioxane resin particles in water, with a narrow particle size distrubution of 7 mm average. The resin particles could easily be isolated by normal methods of filtration or drying.

What is claimed is:

1. A process to prepare polysiloxane microspheres with narrow size distribution having a particle size in the range of about 0.5 microns to about 10 microns comprising the steps of:

(a) combining, by weight, about 0–100 parts of an anionic surfactant, from about 0.01 to about 100 parts of a polymeric stabilizer, from about 0.01 to about 100 parts of an hydroxide base, per about 500 to about 1000 parts of water to form a first aqueous mixture;

(b) adding to said first aqueous mixture from about 5 to about 700 parts, by weight of the water from said first aqueous mixture, of a silane monomer to form a second aqueous mixture;

(c) stirring the second aqueous mixture at a temperature of from about 5° C. to about 90° C. for at least about 1 hours to form an aqueous dispersion comprising polysiloxane microspheres;

(d) separating the polysiloxane microspheres from the aqueous dispersion;

(e) optionally washing the polysiloxane microspheres with water and optionally drying the washed polysiloxane microspheres at a temperature of up to about 300° C.; and (f) optionally jet treating/milling the dry polysiloxane microspheres to yield polysiloxane microspheres with a narrow size distribution having a particle size in the range of about 0.5 microns to about 10 microns.

2. Process of claim 1 wherein the anionic surfactant is a dialkyl sulfosuccinate, alkyl benzene sulfonate, disodium lauryl phenol ether disulfonate, dialkyl benzene sulfonate, or alkyl sulfate.

3. A process of claim 2 wherein the polymeric stabilizer is a polyvinyl pyrrolidone, ethoxylated alkyl phenol, or block copolymers of propylene oxide and ethylene oxide.

4. A process of claim 3 wherein the hydroxide base is a alkali metal hydroxide or ammonium hydroxide, and the silane monomer is a alkoxy silane monomer.

5. A process of claim 4 wherein the alkoxy silane monomer is methyltrimethoxy silane.

6. A process of claim 5 wherein said second mixture is stirred at a temperature of from about 10° C. to about 75° C.

7. A process of claim 6 wherein the polysiloxane microspheres are separated from the aqueous dispersion using filtration techniques.

8. A process of claim 7 wherein the polysiloxane microspheres are dried at a temperature of from about 175° C. to about 225° C.

9. A process of claim 1 wherein the second aqueous mixture comprises, by weight, up to about 50 parts of a anionic surfactant selected from a dialkyl sulfosuccinate, dialkyl benzene sulfonate, and alkyl sulfate, from about 2 to about 15 parts of a polymeric stabilizer, from about 10 to about 75 parts of a metal hydroxide, per about 500 parts of water, in addition to about 50 to about 350 parts of an alkoxy silane monomer, per 500 parts of water.

10. A process of claim 9 wherein the aqueous mixture is stirred at a temperature of about 10° C. to about 50° C. for about 15 about 30 hours.

* * * * *